(12) United States Patent
Hallak et al.

(10) Patent No.: US 12,300,902 B2
(45) Date of Patent: May 13, 2025

(54) WIDELY SCALABLE, MODULAR PHASE CONTROL OF OPTICAL CHANNELS

(71) Applicant: Phase Sensitive Innovations, Inc., Newark, DE (US)

(72) Inventors: Amjed Hallak, Elkton, MD (US); Matthew Gallion, Middletown, DE (US)

(73) Assignee: Phase Sensitive Innovations, Inc., Newark, DE (US)

(*) Notice: Subject to any disclaimer, the term of this patent is extended or adjusted under 35 U.S.C. 154(b) by 0 days.

(21) Appl. No.: 18/616,753

(22) Filed: Mar. 26, 2024

(65) Prior Publication Data

US 2024/0235019 A1    Jul. 11, 2024

Related U.S. Application Data

(63) Continuation of application No. 17/890,017, filed on Aug. 17, 2022, now Pat. No. 11,942,695.

(60) Provisional application No. 63/234,151, filed on Aug. 17, 2021.

(51) Int. Cl.
*H01Q 3/26* (2006.01)
*H04B 10/61* (2013.01)

(52) U.S. Cl.
CPC ....... *H01Q 3/2676* (2013.01); *H04B 10/6165* (2013.01); *H04B 2210/006* (2013.01)

(58) Field of Classification Search
None
See application file for complete search history.

(56) References Cited

U.S. PATENT DOCUMENTS

| | | |
|---|---|---|
| 2003/0053180 A1 | 3/2003 | Carey |
| 2004/0208644 A1 | 10/2004 | Sirat et al. |
| 2011/0243490 A1 | 10/2011 | Ryf |
| 2012/0014699 A1 | 1/2012 | Curt et al. |
| 2012/0177384 A1 | 7/2012 | Ryf |
| 2017/0033870 A1 | 2/2017 | Dangui et al. |
| 2019/0356394 A1* | 11/2019 | Bunandar ........... H04J 14/0279 |

FOREIGN PATENT DOCUMENTS

WO    WO-2017203271 A1 * 11/2017

* cited by examiner

*Primary Examiner* — Darren E Wolf
(74) *Attorney, Agent, or Firm* — Muir Patent Law, PLLC

(57) ABSTRACT

A plurality of digital processors may be used to adjust phases in a plurality of phase modulators. The plurality of digital processors may receive a periodic pulse, or heartbeat signal, from a synchronization controller in order to control the digital processors. The synchronization controller may output an additional signal used to determine and to control the phase of the signals output from the plurality of phase modulators.

21 Claims, 11 Drawing Sheets

WIDELY SCALABLE, MODULAR PHASE CONTROL OF OPTICAL CHANNELS

RELATED APPLICATIONS

This application is a continuation application of U.S. patent application Ser. No. 17/890,017, filed Aug. 17, 2022, which is a non-provisional application of Provisional Application No. 63/234,151 filed Aug. 17, 2021, the entire contents of each of which are hereby incorporated by reference.

TECHNICAL FIELD

This disclosure relates generally to digital signal processing, optical coherence, beamforming, and, in particular embodiments to receive signals using phased array antennas.

BACKGROUND

As novel optical systems transition into the realm of multichannel optics, a fundamental synchronization issue arises of stabilizing the relative phase offset between channels. In such systems, it may be desirable to control each channel's optical phase and essentially "lock" them all to the same pulse or heartbeat for optical synchronicity.

With the multichannel systems scaling in size, they may require optical phase control that scales commensurately to support a large, or theoretically unlimited, number of channels. One example optical-channel control functionality may be based on the system described in U.S. patent Pub. No. 2012/0014699, Synchronizing Phases of Multiple Optical Channels, hereby incorporated by reference in its entirety. U.S. patent Pub. No. 2012/0014699 discloses a method, in which one may extract, process, and control the phases of many optical channels. However, the approach disclosed therein may suffer from hardware-based limitations in channel count due to the limit in the maximum capabilities of digital signal processors known as Field Programmable Gate Arrays (FPGAs). Aspects of the present invention address the scaling limitation of that approach by implementing a distributed, yet synchronized, approach, where multiple digital processors, such as FPGAs, operating in unison replace a single FPGA.

SUMMARY

According to some embodiments, a plurality of digital processors are used to adjust phases in a plurality of phase modulators. The plurality of digital processors may receive a periodic pulse, or heartbeat signal, from a synchronization controller in order to control the digital processors. The synchronization controller may output an additional signal used to determine and to control the phase of the signals output from the plurality of phase modulators.

BRIEF DESCRIPTION OF THE DRAWINGS

For a more complete understanding of this disclosure, and the advantages thereof, reference is now made to the following descriptions taken in conjunction with the accompanying drawings, in which.

DETAILED DESCRIPTION

The present disclosure now will be described more fully hereinafter with reference to the accompanying drawings, in which various exemplary implementations are shown. The invention may however, be embodied in many different forms and should not be construed as limited to the exemplary implementations set forth herein. These example implementations are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impractical to list every possible variation for every feature described herein. The language of the claims should be referenced in determining the requirements of the invention.

An apparatus comprising a digital processor, such as an FPGA (field-programmable gate array), phase modulators, a laser, an optical processor, electronic conditioning circuitry, and synchronization circuitry may be utilized to coherently align the phases of multiple optical channels.

Coherent phase alignment of optical channels proves to be a challenge due to the nature of minor environmental acoustic and thermal perturbations in fiber optic cables inducing a phase change in the optical signal carried by the cable. An apparatus may provide a way to compensate for those environmental acoustic and thermal perturbations.

In U.S. patent Pub. No. 2012/0014699, published on Jan. 12, 2012, an example method is disclosed wherein an FPGA is used to determine phase errors and compensation values for each respective optical channel.

Figure 1A:
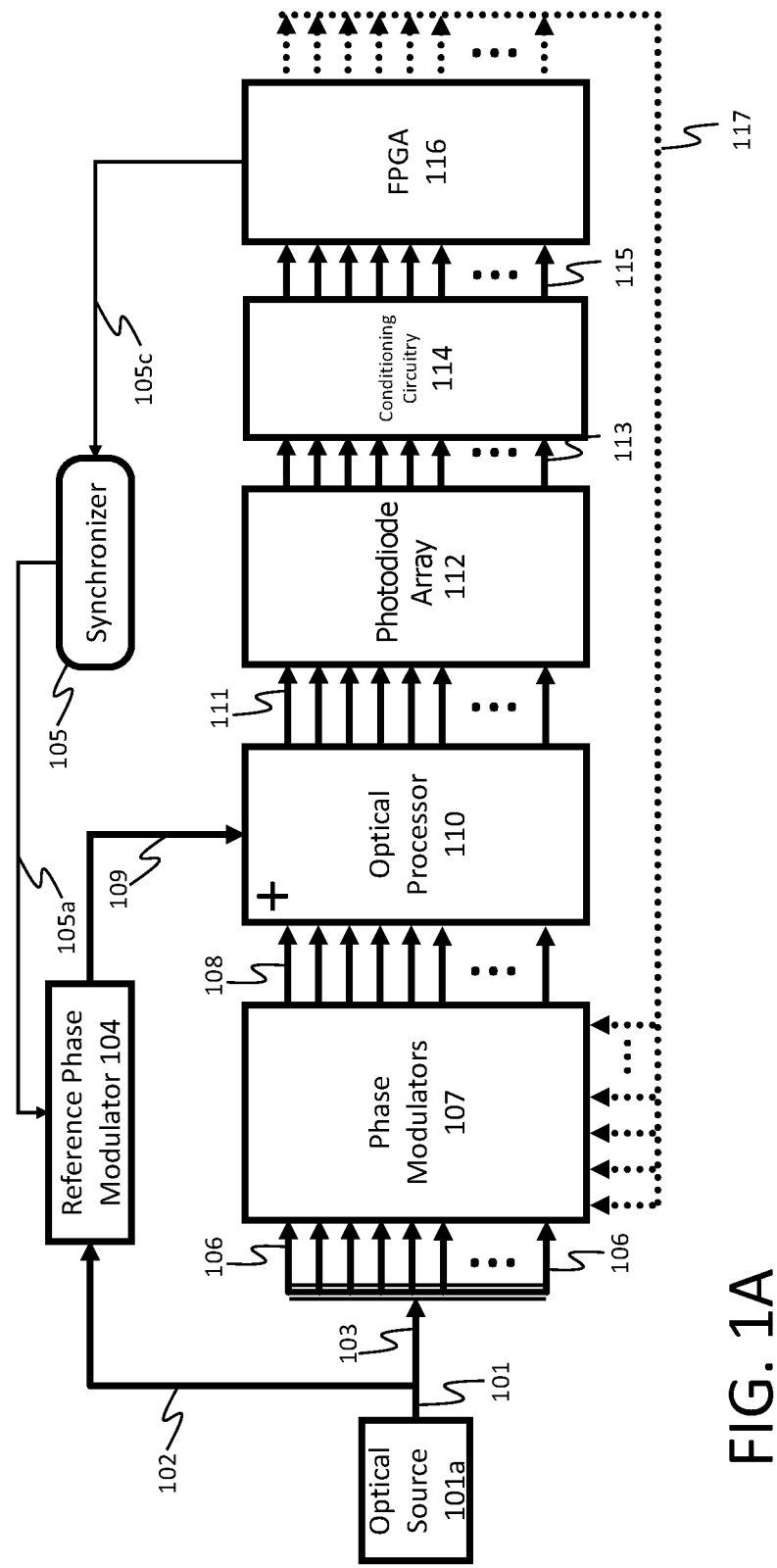
FIG. 1A illustrates a schematic overview of a prior system.

As illustrated in FIG. 1A, which represents a conventional system and method, output 101 of an optical source 101a is split into two paths, one path referred to as the reference path 102, and the other referred to as the carrier path 103. The reference path is phase modulated by reference phase modulator 104 using a periodic right-triangle (sawtooth) voltage function 105a, as shown for example in FIG. 2 of U.S. patent Pub. No. 2012/0014699 or in the top panel of FIG. 1C. The modulating function is generated by the synchronizer 105, which may be a synchronizer circuit. Synchronizer 105 is controlled by the FPGA 116. That is, the FPGA will send a control signal (shown by the arrow 105*c*) to the synchronizer 105 to cause the synchronizer to transmit the voltage function 105*a* to the reference phase modulator 104. Thus, the system of FIG. 1A is set up to only allow for using one FPGA, which limits the system capabilities. The carrier path is further split as in 106 and propagated into multiple phase modulators 107. Each phase modulator may heterodyne the carrier signal with an RF signal to encode data into the optical domain. The phase-modulator outputs 108, and the modulated reference signal 109 are recombined in an optical processor 110 to create combined optical signals 111, each combined optical signal corresponding to a phase modulator of 107. The combined optical signals 111 are each an optical waveform that is synthesized through interference between the output 109 of the reference phase modulator 104 and the outputs 108 of the phase modulators 107. Each combined optical signal 111 may be described as an interference signal. The combined optical signals 111 are then converted into electrical currents 113 by photodiodes of the photodiode array 112 such that each phase modulator has a corresponding electrical current that carries optical phase information in the form of the phase of the sinusoidally varying photocurrent. Examples of these signals can be seen in U.S. patent Pub. No. 2012/0014699, FIGS. 3A-3E, and FIG. 4, top sinusoidal signal. For example, in U.S. patent Pub. No. 2012/0014699, FIG. 3A shows an example sawtooth voltage function, FIG. 3B shows an example modulated reference signal 109, FIG. 3C shows an example phase-modulator output 108, FIG. 3D shows a combined signal (combining modulated reference signal 109 with a phase-modulator output 108), and FIG. 3E shows just the interference pattern resulting from the combined signal (e.g., a sinusoidal signal). FIGS. 3A-3E of U.S. patent Pub. No. 2012/0014699 are optical signals.

Figure 4:
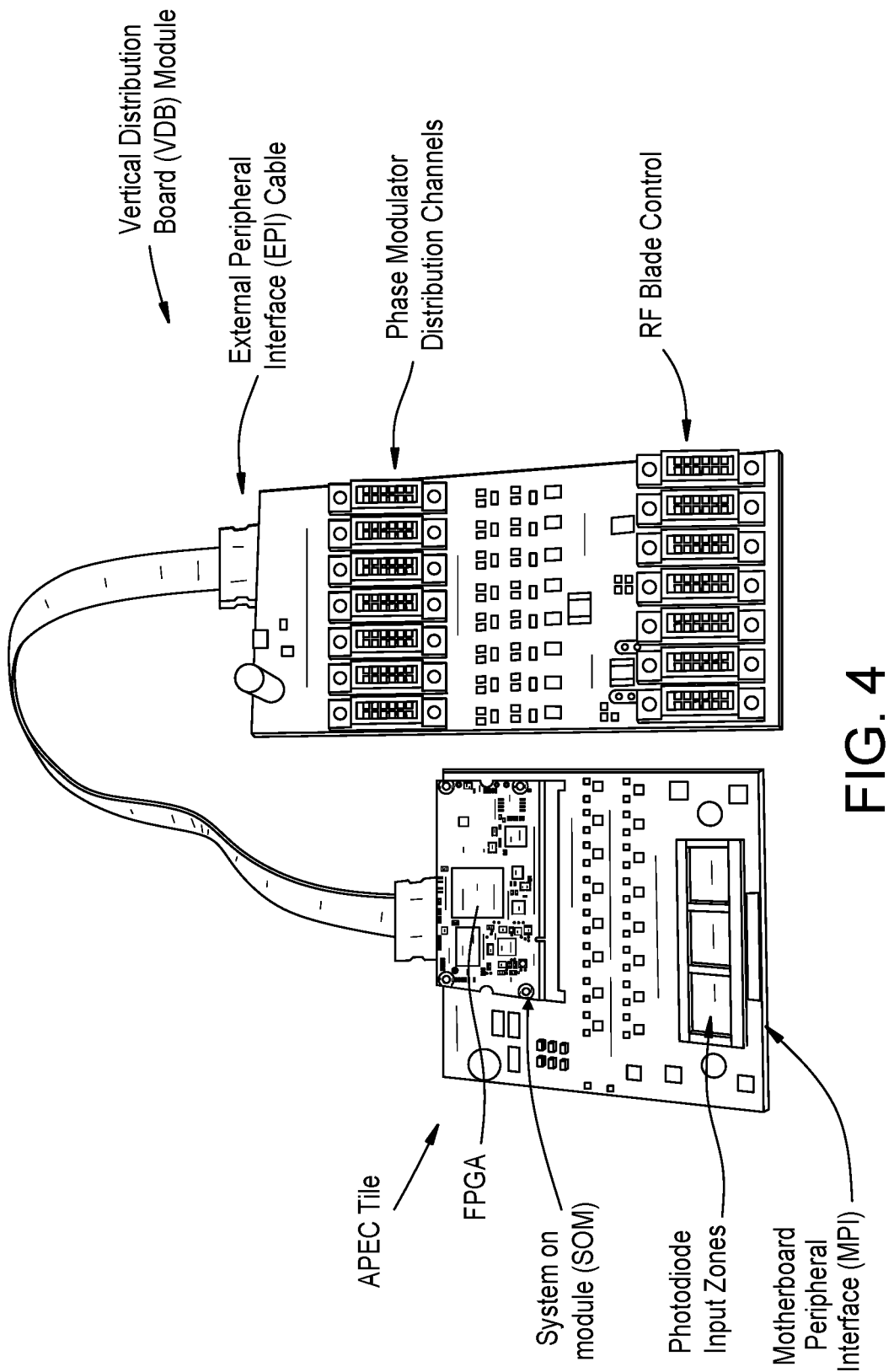
FIG. 4 shows an implementation of a 64-channel subset system comprising a single APEC Tile, and a connection to a 64-channel phase distribution PCB.
Figure 5:
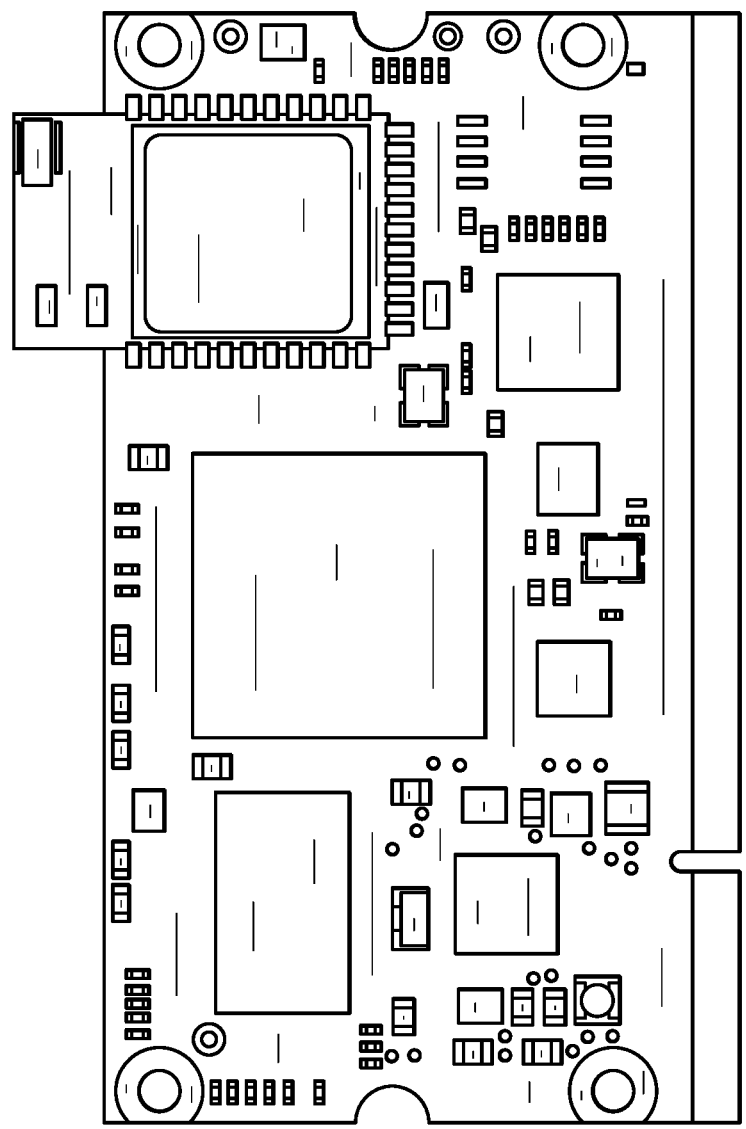
FIG. 5 shows an iWave G28M FPGA System-on-Module, which may be used to recover phase errors and calculate compensation values.

The electrical signals, or electrical currents 113 are conditioned, or converted in conditioning circuitry 114 using transimpedance amplifiers and comparators (e.g., as depicted in FIG. 5 of U.S. patent Pub. No. 2012/0014699) to yield conditioned waveforms 115 such that the photocurrent is converted to a voltage, and inflection points are converted to rising and falling edges of a square wave pattern, which can be considered a digital signal, converted from analog. For example, in FIG. 4 of U.S. patent Pub. No. 2012/0014699, the lower square wave depicts an electrical signal, after being converted by photodiode array 112, for example, from the optical signals input to photodiode array 112, and being further processed by conditioning circuitry 114. Embodiments of this conditioning circuitry may entail those listed in U.S. patent Pub. No. 2012/0014699.

Figure 1B:
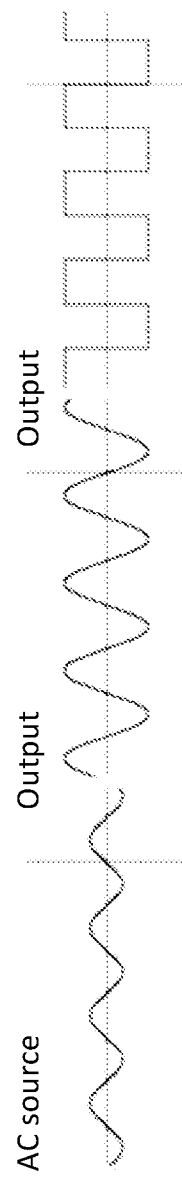
FIG. 1B illustrates a small sinusoidal signal, its amplified variant, and its discretized calculation of the amplified sinusoid's zero-crossings.

An example conditioning process is illustrated in FIG. 1*b*, where the left panel represents the photocurrent at the output of a photodiode 113, the middle panel represents the voltage at the output of a transimpedance amplifier, and the right panel represents the output of a comparator. Equivalently, the comparator may be thought of as converting the continuous sine wave to a discretized, two-level waveform, and other embodiments of this invention may use a 1-bit analog-to-digital converter (ADC).

Figure 1C:
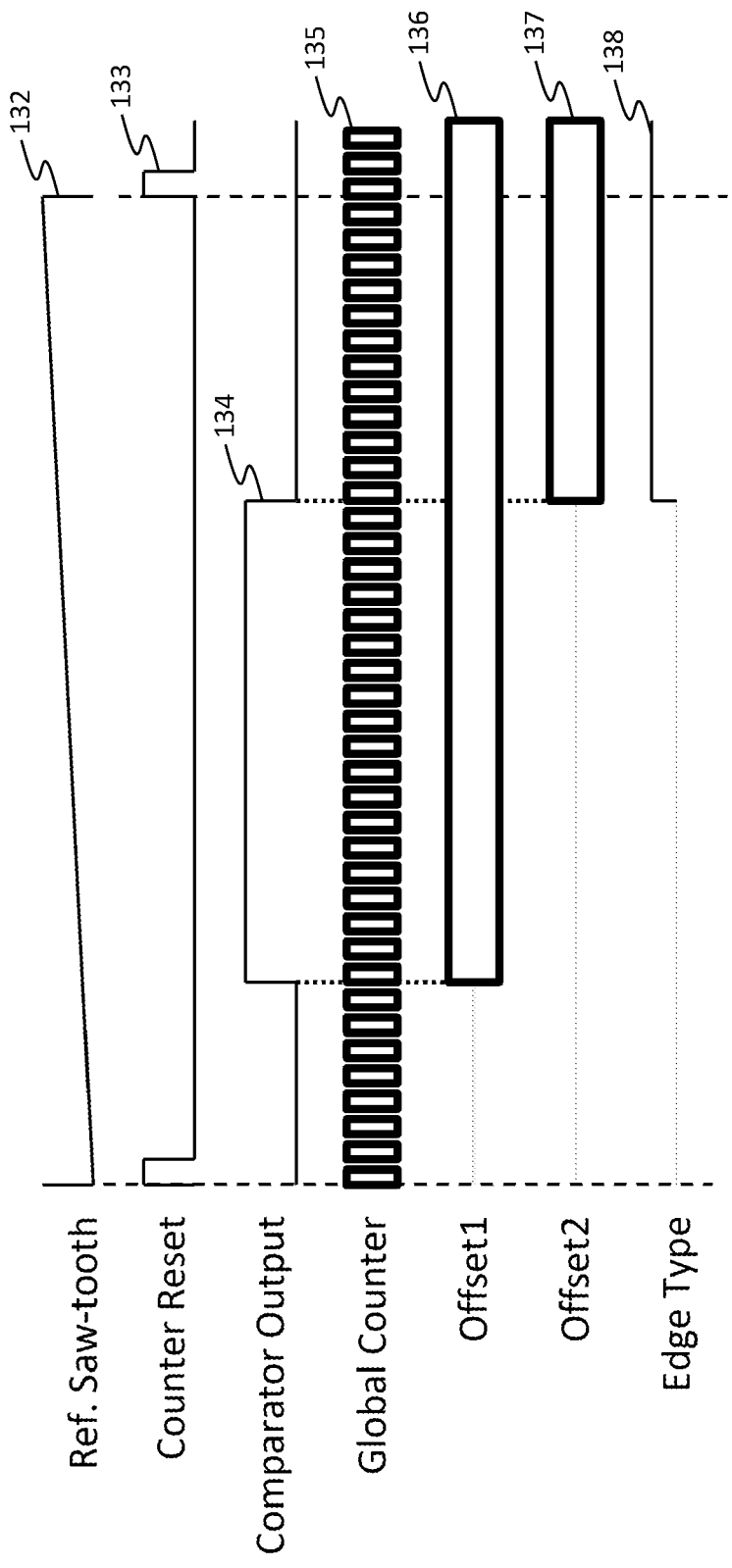
FIG. 1C illustrates a method in which the phase offset of each optical channel may be digitally captured with respect to a counter reset.

By virtue of having discretized outputs, a digital processor such as an FPGA 116 can now sample the data and interpret the inflection points as a change of state from a "zero" to a "one" on the rising-edge inflection points, or vice-versa for the falling inflection points. The timing of the rising/falling edges is then correlated in the FPGA with a global counter associated with a data-sampling clock, and the counter resets for every cycle at the falling edge 132 of the sawtooth function driving the reference phase modulator 104, as illustrated in FIG. 1C, where the Ref. Saw-tooth represents the synchronizer output 105*a* driving the reference phase modulator 104, the Counter Reset 133 represents the start of a new periodic cycle of the sawtooth, the Comparator Output 134 represents a conditioned waveform 115 from the combination of the reference and an individual carrier channel, the Global Counter 135 illustrates digital clock cycles to measure the timing of the inflection points of the Comparator Output 134, the Offset1 136 and Offset2 137 variables correspond to latched values of Global Counter, and Edge Type 138 corresponds to whether the Comparator Output 134 had an initial rising or falling edge.

Figure 1D:
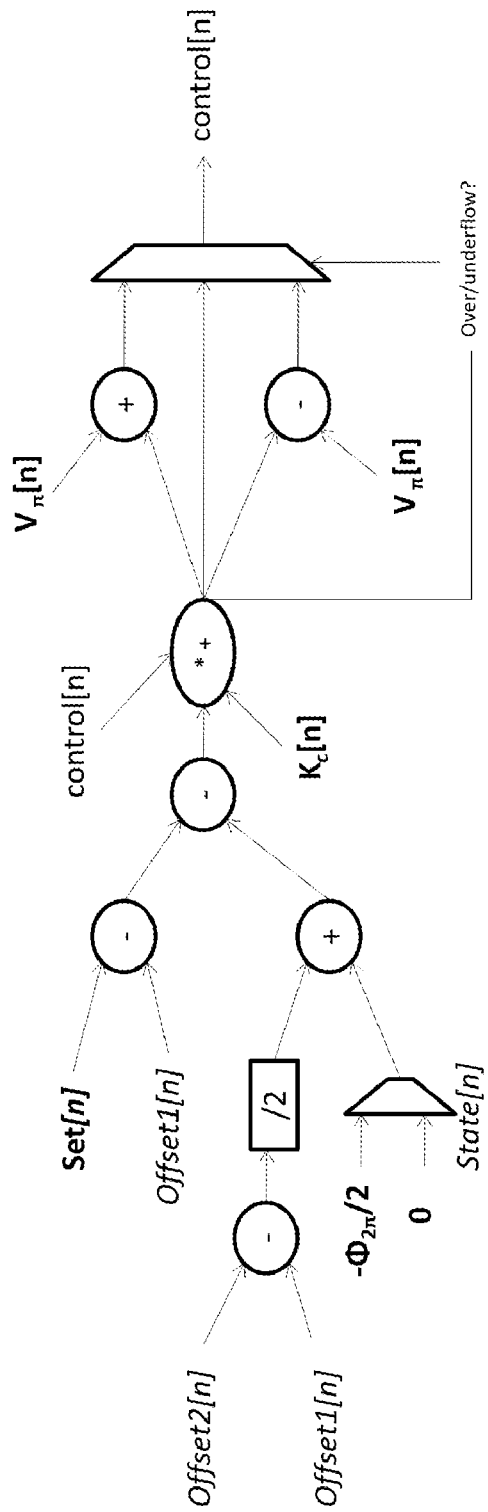
FIG. 1D illustrates a calculation to determine a phase error and compensation value based on captured offsets denoted in FIG. 1C.
Figure 2:
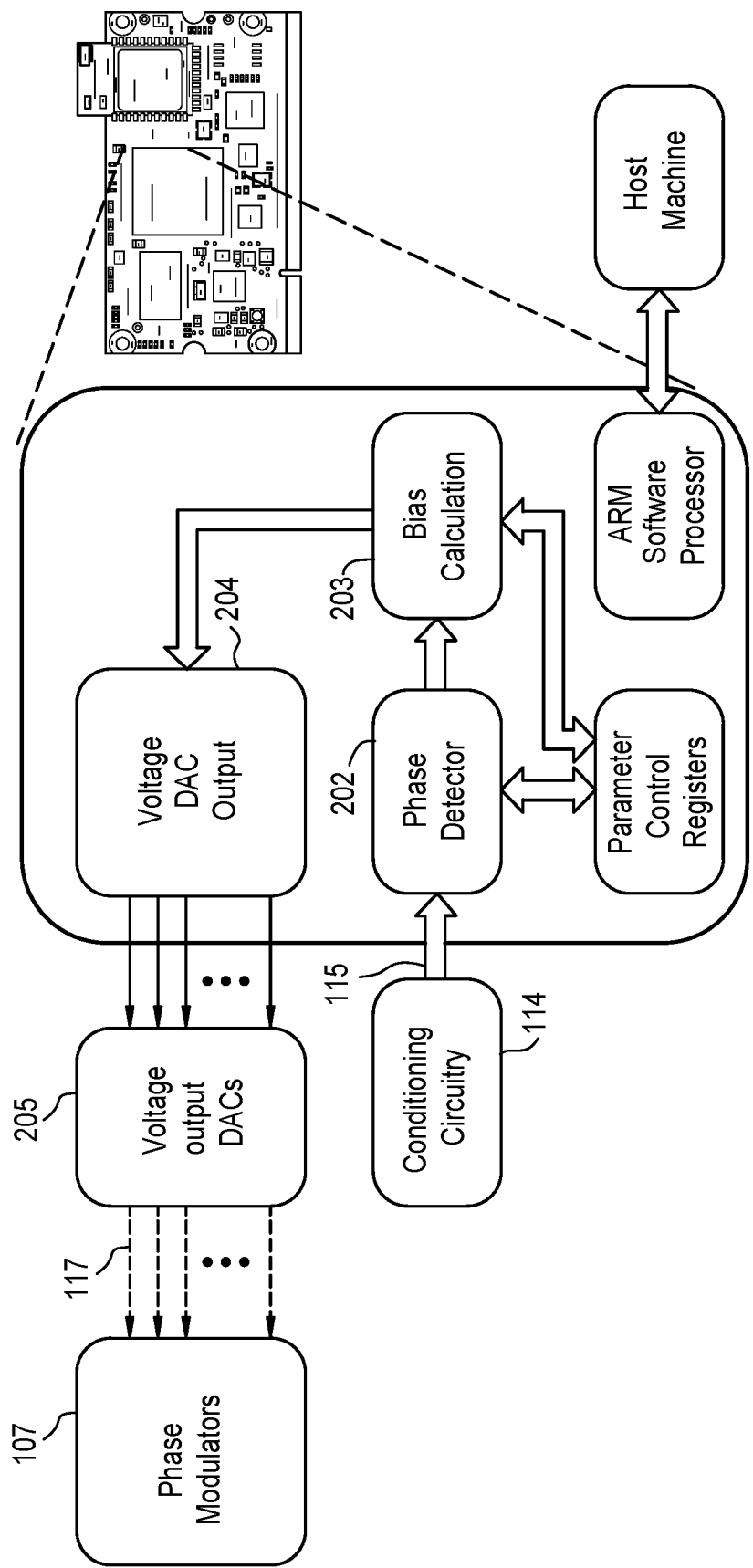
FIG. 2 illustrates a high-level block diagram of a closed-loop system implemented with an FPGA.

By virtue of resetting the phase counter with every cycle of the sawtooth, the phase error and compensation values of each carrier channel of the array can be extracted in a way that is analogous to that explained in U.S. Patent Pub. No. 2012/0014699 and corrected for with an error voltage adjustment in the carriers' phase modulators 107. This error voltage is obtained by pipelining a calculation between the global phase counter and the inflection points of each carrier channel input 115 into the FPGA, whose calculation data path is illustrated in FIG. 1D. An FPGA implements this calculation data path. For example, as shown in FIGS. 1C and 1D, the average between Offset2 137 and Offset1 136 is taken, and a 180 degree phase shift is either added or is not added, depending on the Edge Type 138. The Edge Type 138 is determined by whether Comparator Output 134 had an initial rising edge or an initial falling edge. The resultant value of the addition, or lack thereof, is compared to a setpoint and proportionally multiplied to calculate an appropriate error voltage 117 per channel. This error voltage may be shifted by an equivalent error voltage resulting in a 360 degree phase shift either in the positive or negative direction in order to remain within the same range, or ranges to maintain the error voltages 117 within 360 degrees of range, or any integer multiple of 360 degrees, depending on the supply voltage of the error voltage applied to the phase modulator. FIG. 2 illustrates the digital calculation data path of the discretized channel input. Conditioning circuitry 114 feeds a phase detector that calculates the Offset1 136 and Offset2 137 values of FIG. 1C, a bias calculation block 203, whose function is illustrated in FIG. 1D, and a parallel DAC output 204 that drives a digital state machine for high-speed control of multiple voltage-output DACs 205 to supply a bias based on the calculated compensation values to each individual phase modulator for fine-grain phase control. More generally, if the start (e.g., falling edge) of the sawtooth is synchronized with the counter reset pulse, and the global counter is counting an amount of time between the counter reset and the time at which the comparator output signal changes from 0 to 1 and from 1 to 0, then a point of maximum and minimum interference in the signals 111 can be determined, and so a phase shift needed to make the reference signal in reference path 102 and the signal 106 going into each phase modulator 107 be in phase with other, and to make the reference signal in reference path 102 and the signal 108 coming out of each phase modulator 107 be in phase with each other or have a pre-set phase relationship with or phase difference from each other that remains constant over time, can be determined. Accordingly, the voltage-output DACs provide error voltages 117, shown in FIG. 1A, that bias phase modulators 107 to adjust the phase of signals 108 output from phase modulators 107. Further details of this calculation and data path according to some examples are disclosed in U.S. patent Pub. No. 2012/0014699 and may be used to implement aspects of the present invention.

With the stated description of the prior art, an embodiment of this invention is now presented such that the phases of each optical phase modulator can be controlled in real-time such that their phase errors can be locked or discretely phase shifted and then locked to realize a known phase offset of each optical channel with respect to a sawtooth voltage function. This optical phase lock is implemented with a closed-loop optoelectronic network including a plurality of digital processors, such as FPGAs, all controlled by a separate digital processor, described as a synchronization controller. The synchronization controller acts independently and is not under the control of an FPGA such as FPGA 116 of FIG. 1A. Contrary to the conventional art where a digital processor controls its own timing as well as the timing of a synchronizer, the synchronization controller according to embodiments of the present invention sends control signals to a plurality of digital processors, to control those digital processors simultaneously. Further details are described in connection with FIG. 3 and later figures, as discussed below.

Figure 3:
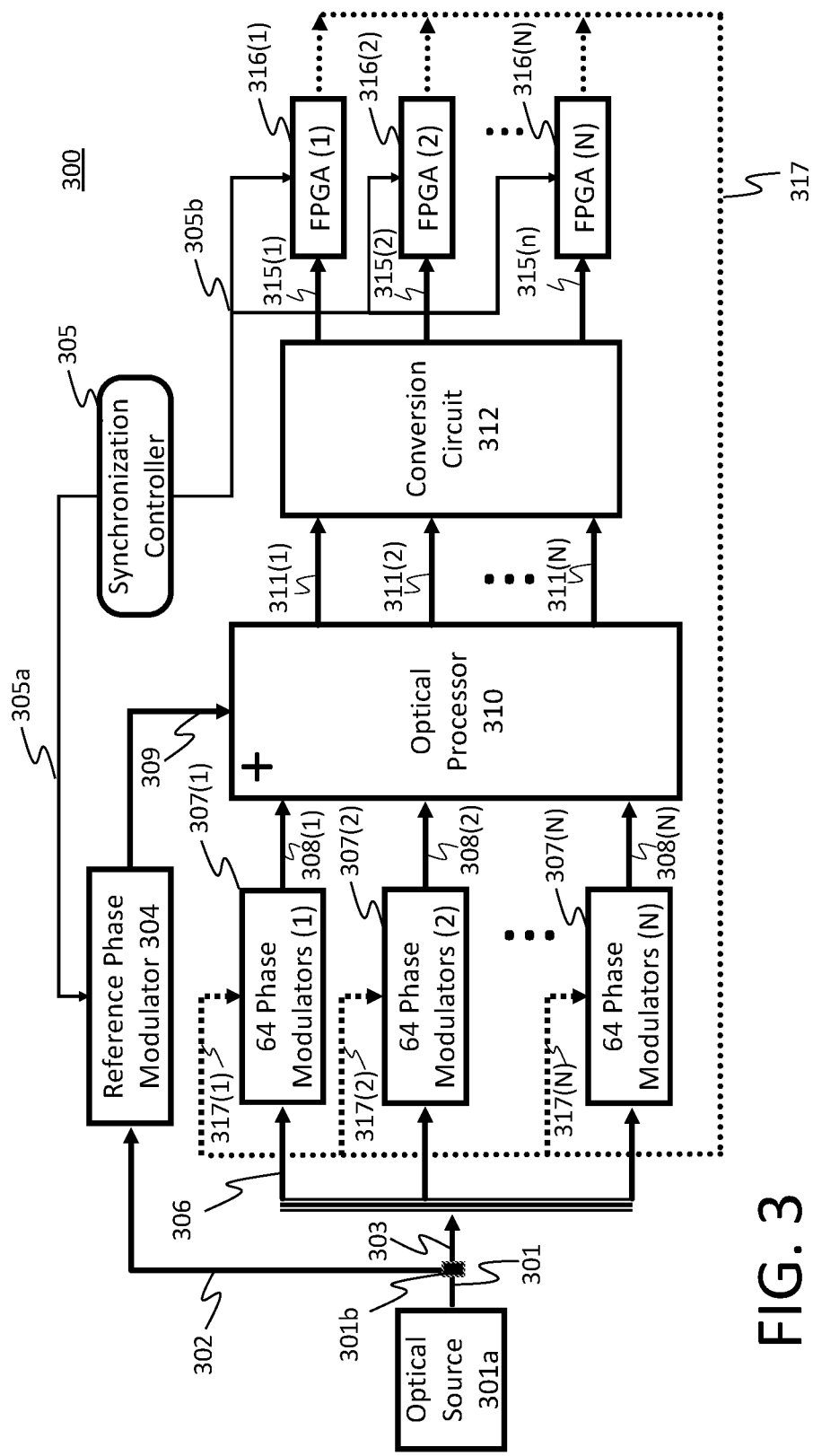
FIG. 3 illustrates a schematic overview of a system for synchronizing phase of multiple optical signals, according to an example embodiment.

FIG. 3 illustrates a schematic overview of a system for synchronizing phase of multiple optical signals, according to an example embodiment. As illustrated in FIG. 3, a system 300 includes an optical source 301a, a splitter 301b, a plurality of phase modulators 307 organized in phase modulator groups 307(1)-307(N), a reference phase modulator 304, a synchronization controller 305, an optical processor 310, a conversion circuit 312, and a plurality of digital processors 316(1)-316(N). As is traditional in the field of the disclosed technology, features and embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

The optical source 301a may be, for example, a laser or another light source, which may output an optical source signal 301, which may be a laser light, or other light having a particular frequency. The splitter 301b may be any known optical splitter (e.g., a partially reflective glass, a glass prism or cube, or a fiber splitter, or a fiber directional coupler, etc.), connected and configured to split the optical source signal 301 into multiple signals. For example, one signal output from the splitter 301b is a reference signal 302, and another signal output from the splitter 301b is a carrier signal 303. Reference signal 302 may be input to a reference phase modulator 304. Carrier signal 303 may be further split into a plurality of signals 306, which may be input into phase modulators 307. The combination of splitter 301b and additional splitters for forming a plurality of carrier signals input into the phase modulators 307 may be described together as a splitter, which splits the optical source signal 301 into a plurality of signals 306 including a plurality of phase modulator input signals including the carrier signal, each of which may be described as a carrier signal, and a reference signal. The carrier signals and the reference signal may be synchronized to initially have the same frequency and phase.

Reference phase modulator 304 is connected to receive reference signal 302 from optical source 301a as well as a signal 305a from synchronization controller 305, and to output a modulated reference signal 309. For example, the signal 305a may be a voltage function, which may have a periodic pattern, such as a sawtooth pattern such as discussed previously in connection with FIG. 1C. The voltage function may represent phase versus time. In operation, reference phase modulator 304 receives a voltage function 305a and reference signal 302, and modulates the reference signal using the voltage function, as discussed for example, in connection with FIG. 1C. The modulated reference signal 309 is transmitted to an optical processor 310. For example, the voltage function 305a may be a signal that causes the phase of the modulated reference signal, to linearly vary by a particular amount (e.g., 1 degree) over time (e.g., at each clock cycle or step of the voltage function). Therefore, at a first time, the phase of the modulated reference signal 309, which initially has the same frequency as the reference signal 302 and the carrier signal 303, may be shifted by one degree in phase in a particular direction, at a second time, the phase of the modulated reference signal 309 may be shifted by two degrees in phase in the same direction, etc.

Synchronization controller 305 is connected to transmit the signal 305a (e.g., a voltage function) to reference phase modulator 304 and is connected to transmit a signal 305b to a plurality of digital processors 316(1)-316(N). The signal 305b may be, for example, a voltage function start indicator signal, that includes, for example, a pulse that indicates the start of the voltage function being transmitted as signal 305a to the reference phase modulator. The start may be, for example, a value that causes the phase of the modulated reference signal 309 to be shifted 0 degrees with respect to the reference signal 302. The voltage function start indicator signal may be described as a heartbeat signal, or a periodic pulse signal. Different from prior art systems such as discussed previously, the heartbeat signal 305b is transmitted from synchronization controller 305 to the digital processors 316(1)-316(N). The heartbeat signal 305b may therefore control the digital processors 316(1)-316(N) in a manner to be described in more detail below. The heartbeat signal 305b may be a similar signal to that described in connection with FIG. 1C (signal 133) above, and may be a counter reset signal that resets a counter that begins counting at the beginning of a cycle of the voltage function 305a. Synchronization controller 305 may be, for example, a digital processor such as an FPGA. The heartbeat signal 305b may be transmitted simultaneously and synchronously to each digital processor 316.

Phase modulators 307 may be organized into groups, such as a first group 307(1), a second group 307(2), and additional groups up to an Nth group 307(N). In some embodiments, N may be an integer having a value from 2 to 16. However, N is not limited as such, and may be greater than 16 (e.g., 32, 64, or higher). In one embodiment, each phase modulator group 307(1)-307(N) includes 64 phase modulators, and each phase modulator is connected to receive a carrier signal as an input and outputs a signal 308 described as a phase modulator output signal or phase modulator output, or alternatively described as an optical input signal. Phase modulator output signals 308 may be grouped into groups 308(1)-308(N), which correspond to the phase modulator groups 307(1)-307(N).

Each phase modulator 307 may receive as input a carrier signal and an information signal (not shown), and converts the information signal to the optical domain using the carrier signal. For example, the information signal may be an RF signal, or other signal. As an example, each phase modulator 307 may heterodyne the carrier signal 306 with an RF signal or other information signal to encode data into the optical domain. Each phase modulator 307 may be configured to perform phase adjustment of the carrier signal and modulation of the information signal using the phase-adjusted carrier signal. Each information signal may include, for example, a plurality of bits of information, encoded in the RF or other domain, or may be an analog signal having information encoded therein. Each phase modulator 307 may also receive a respective adjustment signal 317. The adjustment signals 317 may similarly be organized into a plurality of groups 317(1)-317(N). Each adjustment signal 317 may be used along with a respective information signal and carrier signal to output a phase modulator output signal 308. The adjustment signals are output from the digital processors 316(1)-316(N), and are described in greater detail below.

Optical processor 310 is connected to receive the modulated reference signal 309 and the phase modulator output signals 308, and is configured to, for each phase modulator output signal 308, combine the phase modulator output signal 308 with the modulated reference signal 309. For each phase modulator output signal 308 combined with the modulated reference signal 309, a respective interference signal 311 is generated. The interference signal 311 reflects whether the modulated reference signal 309 is in phase with the respective phase modulator output signal 308, and may be a periodic signal (e.g., sine wave) having the same frequency as the frequency of a sawtooth voltage function. For example, the magnitude of the interference signal 311 may change for each degree of variation in the voltage function 305a, to have the same frequency as the voltage function 305a. An example of this can be seen in FIG. 3E of U.S. patent Pub. No. 2012/0014699. Each phase modulator output signal 308 input to optical processor 310 (e.g., optical input signal) may therefore have a corresponding respective interference signal 311 output from the optical processor 310 (e.g., optical output signal). The interference signals may vary depending on differences in the phase of the different phase modulator output signals 308. The phase differences may be pre-set by a predetermined offset for some phase modulators 307, but may additionally include a component due to environmental factors that is not intended. The phase of the phase modulator output signals 308 can be further adjusted by phase modulators 307, as will be described below.

Conversion circuit 312 is connected to receive the interference signals 311, which in one embodiment are analog optical signals, and convert each interference signal 311 to the digital electrical domain. For example, conversion circuit 312 may include a plurality of photodiodes formed in a photodiode array, and may include one or more comparators. For example, conversion circuit 312 may include components such as depicted in FIG. 5 of U.S. patent Pub. No. 2012/0014699. As a result of the optical-to-electrical conversion, and analog-to-digital conversion, in one embodiment, for each interference signal, a square wave is generated, which has rising and falling edges that correspond to zero crossings of the interference signal. This signal is then output from the conversion circuit 312 and is input to a digital processor 316. This is only one example, however. The rising and falling edges need not correspond to the zero crossing if a different type of circuit is used to convert from analog to digital. For example, another circuit could be used that causes the rising and falling edges of the square wave to correspond to a peak and valley of the interference signal.

As shown in FIG. 3, the conversion circuit 312 can receive interference signals from the optical processor 310 as N groups of interference signals 311(1)-311(N), and can respectively output converted signals as N groups of converted signals (e.g., resulting digital signals) 315(1)-315(N). Each group of converted signals can then be input into a single respective digital processor 316 from among digital processors 316(1)-316(N).

Digital processors 316 may be, for example FPGAs, where each FPGA is connected to receive a group of converted signals 315 from groups 315(1)-315(N) and to output a group of adjustment signals 317 from adjustment signal groups 317(1)-317(N). However, digital processors 316 can be other types of processors, such as complex programmable logic devices (CPLDs), digital signal processors (DSPs), or application-specific integrated circuits (ASICs).

A method is now disclosed such that multiple digital processors, such as FPGAs, may be operated in parallel to overcome the limitations of a single electronic system. This method is illustrated in FIG. 3, where compared to FIG. 1, a photodiode array 112 and conditioning circuitry 114 is replaced is with a conversion circuit 312, which may be a photodiode array and breakout module, which distributes a group of photocurrents (e.g., digital signals that correspond to outputs from optical processor 310) to each individual digital processor (e.g., FPGA module). Each digital processor 316 is now responsible for its own subset, or group, of phase modulators 307. In one embodiment, each group of phase modulators 307 may include 64 phase modulators. The synchronization controller 305 is now utilized to generate a reference heartbeat 304 to be distributed and delay-matched to each digital processor 316 for synchronicity. Each digital processor 316 now implements its own closed control loop algorithm similar to the one illustrated in FIG. 2.

As discussed previously, a plurality of adjustment signals 317 may be sent from each digital processor 316 to each group of phase modulators 307(1)-307(N), and each phase modulator 307 can use the received adjustment signal 317 to shift the phase of the output signal to result in a phase modulator output signal 308. Thus, each phase modulator 307 includes a circuit configured to change the phase of the output signal 308 by an amount corresponding to the adjustment signal 317. Each phase modulator 307 may initially be set, for example by a digital processor 316, so that the phase modulator output signal 308 has a pre-set phase relationship to the initial carrier signal 303. For example, the pre-set phase relationship could be that the two signals are in phase, or can be that the two signals have a predetermined phase difference between them, described as a predetermined offset. In some applications, the plurality of digital processors 316 can be configured to cause the plurality of phase modulator output signals 308 to have pre-set phase relationships with respect to each other that may not be in phase (e.g., a blazed phase profile, or a parabolic phase profile). The adjustment signal 317 can be set by the digital processors to result in this phase profile for the phase modulators 307. Each adjustment signal may be, for example, a voltage that biases the phase modulator 307 to adjust the phase of the signal being output. The adjustment signals 317 may be generated by the digital processors 316, for example, using hardware and/or software that calculates a voltage according to an equation such as shown and discussed in connection with FIG. 1D, where offsets 1 and 2, a global counter and edge type information, and a setpoint (Set[n]) are used as inputs, and a control signal (e.g., adjustment signal 317, which may be a voltage value) is output. The adjustment signal 317 may therefore be based on both a set point, which for each phase modulator 307 may correspond to a pre-set phase relationship between the carrier signal 303 and the phase modulator output signal 308, and offsets that may result from environmental factors.

In one embodiment, the plurality of digital processors 316 are configured to repeat the process of outputting the adjustment signals 317 over time, in order to control the phase of the respective phase modulator outputs 308(1)-308(N) so that the plurality of phase modulator outputs are in phase with each other or so that relative phase offsets between different phase modulator outputs are maintained to be the same, and thus remain stable, over time. This can lock the phase relationship between the phase modulator outputs over time, and allows for predictable processing of the plurality of phase modulator outputs, even while environmental factors may be changing over time. According to some embodiments described herein, a digital processor may calculate a compensational voltage to shift the phase of each phase modulator of a plurality of phase modulators independently. A plurality of digital processors may be used to shift the phase of a plurality of groups of phase modulators, and the plurality of digital processors may be controlled by a single controller. This may happen in real-time to create a "phase-lock", as well as tune individual phase modulators to a specific phase to remain locked in a predetermined relationship with other phase modulators.

A unit module according to some embodiments is shown in FIG. 4. The individual unit module, allows for sampling and synchronizing the phases of 64 individual optical channels using a single FPGA, pictured in FIG. 5.

The phase-control functionality of a 64-channel unit module of this apparatus can be expanded into multiple unit modules 316, as illustrated in FIG. 3, where modules are denoted as FPGA (1) to FPGA (N). By increasing the number of optical carriers and the width of the reference source 109, one may scale to as many channels as can be optically processed. A photodiode array should be capable of converting as many channels as an optical processor can provide into electrical currents, at which point the system size is limited only by the circuit board footprint limit, and the limit of optical-component sizes.

Given that one may make a PCB as large as 3×3 ft in a standard fabrication order or by combining multiple PCBs, a PCB may create a very large footprint for a photodiode array, potentially capable of supporting many thousands of channels. Given that free-space optics can be made as large as one may like, limitations on the optical processing channel count are removed. By having a single lightweight master microcontroller, which may be a digital processor such as an FPGA module, generate and control the sawtooth and a global phase "counter reset" pulse to all other digital processors, which may also be FPGA modules, which FPGA modules are sampling and correcting channels, one may use as many 64-channel modules as needed to sample, correct, and control all the optical phases. Synchronous application of the phase counter reset results in a ubiquitous, modular approach, where each FPGA module only knows its own realm of 64 channels and the system can be scaled to an unlimited number of channels.

Figure 6:
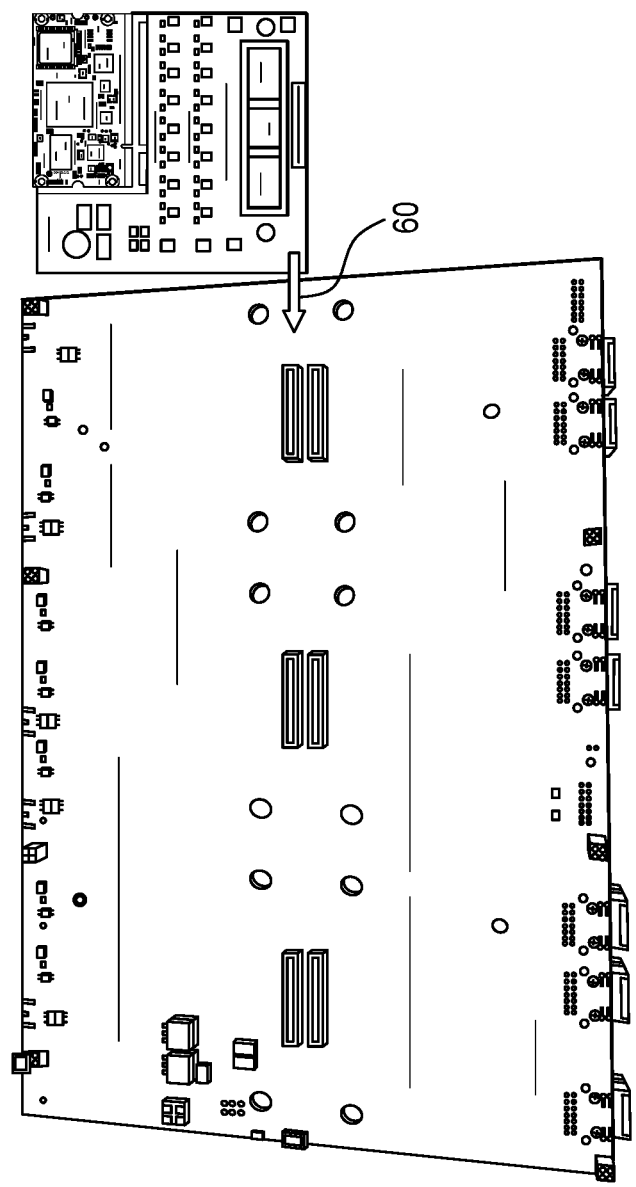
FIG. 6 shows a photodiode distribution motherboard and illustrates a connection point to an APEC Tile.
Figure 7:
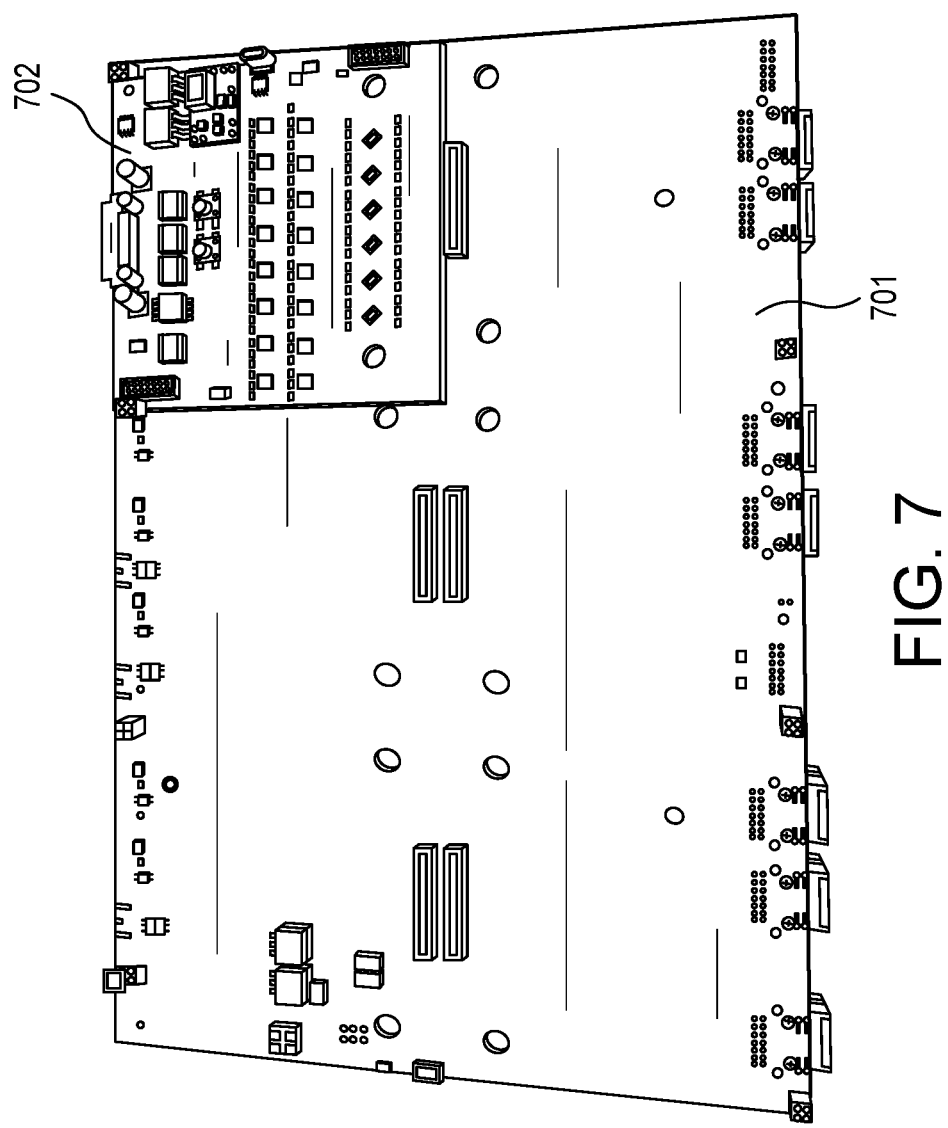
FIG. 7 shows an APEC Tile mated to a photodiode distribution motherboard using the connection point.
Figure 8:
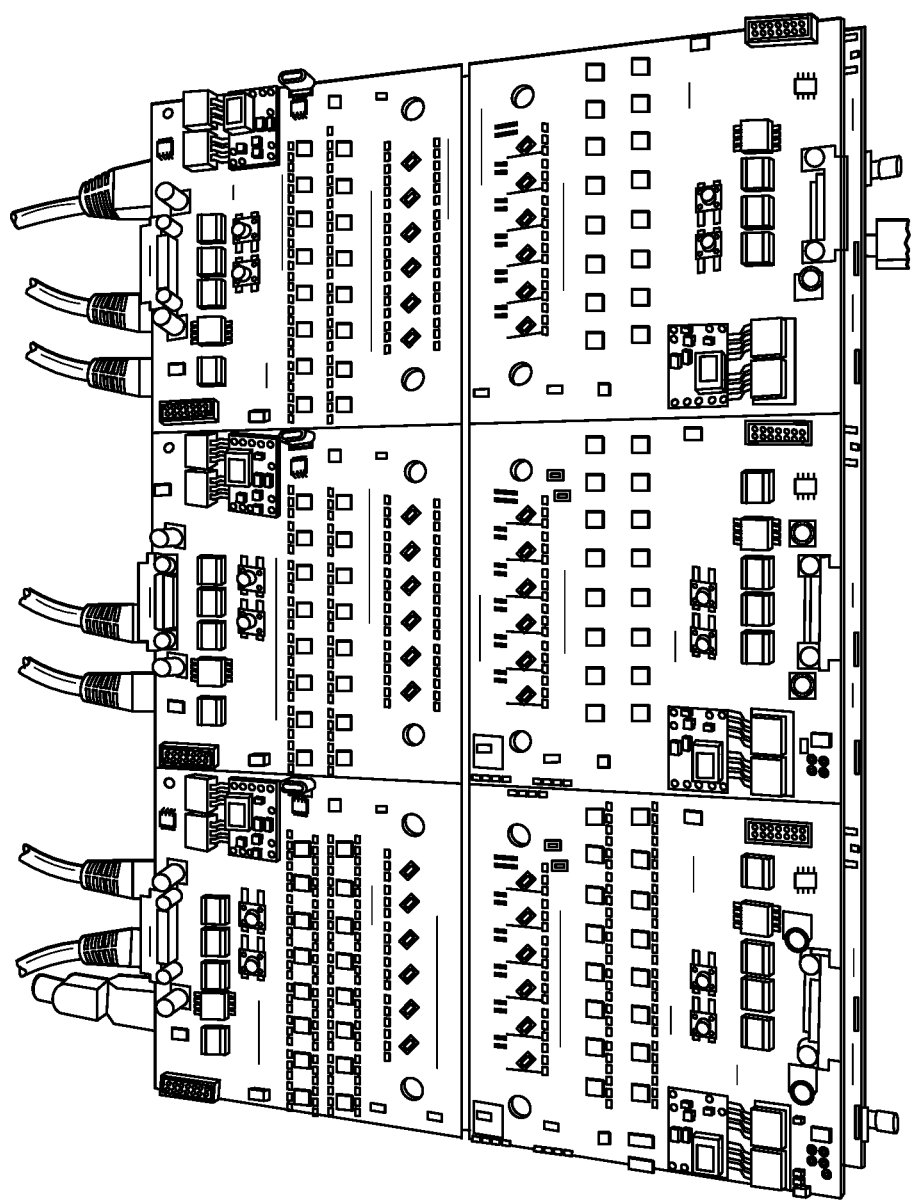
FIG. 8 shows an implementation of a 384-channel system comprising of 6 APEC Tiles and a motherboard distributing 64 photocurrents to each APEC Tile.

A scaled implementation having 384 channels according to one embodiment is now described. According to one embodiment of this invention, to control the optical phases of 384 different channels, the system was implemented with 6 Analog-to-Digital Phase Error Correction (APEC) tiles. FIG. 6 shows a "motherboard" (e.g., a printed circuit board) with a single APEC tile to its right. Arrow 60 shows how the APEC tile connects to the "motherboard." Each APEC tile consists of an iWave G28M System-on-Module as a digital processor, an entry point for photocurrents or a photodiode array, and photocurrent conditioning circuitry (e.g., conversion circuitry), and a means of applying phase error correction signals to Digital-to-Analog converters for phase modulator interfacing. FIG. 7 demonstrates an APEC tile 702 fitted into said motherboard 701. The motherboard provides a structure that "fans-out" the input channels into groups of 64, for each APEC tile to individually process. FIG. 8 illustrates a fully integrated 6-APEC Tile array to ultimately process 384 optical channels. Each APEC tile feeds its processed values to a phase distribution board over a data cable, as shown in FIG. 4. This board will then apply those error voltages into phase modulators to individually lock and control the phases of every optical channel fed to the motherboard. The motherboard may include the synchronization controller mounted thereon, separately from the APEC Tiles, such as a digital processor. In one embodiment, the synchronization controller is mounted on the backside of the motherboard (not seen in FIGS. 6-8).

This system theoretically has an ability to control an unlimited number of optical channels using a low-cost, low-SWAP (Size, Weight, and Power) implementation. The method described here has been proven to work for as many channels as one can supply to the APEC tiles. For example, 64*N input channels may be processed, where N is the number of APEC tiles.

This invention may be used to synchronize phases both within a system and external to the system. The synchronized "counter reset" pulse may be distributed to as many APEC tiles, or systems, as one may need. Multiple systems can be synchronized to one effective heartbeat, resulting in widespread synchronicity.

Terms such as "the same" or phrases such as "maintained to be the same" are intended to include minor variations that do not otherwise affect the operation of the system. The term "substantial" or "substantially" may be used to reflect this meaning.

The following publications also are incorporated by reference in their entirety and provide details of systems and methods in which this invention may also be implemented:

Dillon, Thomas E., et al. "Passive millimeter wave imaging using a distributed aperture and optical upconversion." Millimetre Wave and Terahertz Sensors and Technology III. Vol. 7837. International Society for Optics and Photonics, 2010.

C. A. Schuetz, J. Murakowski, G. J. Schneider and D. W. Prather, "Radiometric Millimeter-wave detection via optical upconversion and carrier suppression," in IEEE Transactions on Microwave Theory and Techniques, vol. 53, no. 5, pp. 1732-1738, May 2005, doi: 10.1109/TMTT.2005.847106.

What is claimed is:

1. An apparatus for controlling phase of a plurality of optical signals, the apparatus comprising:
    a plurality of phase modulators, each configured to be connected to receive an optical carrier signal and based on the optical carrier signal, to transmit an output signal, thereby resulting in a plurality of respective phase modulator output signals as a plurality of optical input signals;
    a synchronization controller configured to generate and output a periodic voltage function and a periodic pulse signal, the periodic pulse signal temporally synchronized to the periodic voltage function;
    a reference phase modulator configured to be connected to receive the periodic voltage function from the synchronization controller and to receive a reference signal having the same phase and frequency as the optical carrier signal, and configured to modulate the optical reference signal according to the periodic voltage function to generate a modulated reference signal, and to output the modulated reference signal;
    an optical processor connected to receive the modulated reference signal and the plurality of optical input signals and configured to, for each particular optical input signal of the plurality of optical input signals, generate an interference signal based on the particular optical input signal and the modulated reference signal, thereby generating a respective interference signal for each respective optical input signal of the plurality of optical input signals; and
    a plurality of digital processors, connected to simultaneously receive the periodic pulse signal output by the synchronization controller and the interference signals, each digital processor connected to a respective group of phase modulators and configured to output an adjustment signal to a respective phase modulator of the respective group of phase modulators, wherein the adjustment signals for each group of phase modulators are based on respective interference signals generated by the optical processor and their temporal relation to the periodic pulse signal, and each adjustment signal causes a respective phase modulator to control the phase of its respective phase modulator output signal.

2. The apparatus of claim 1, wherein at least some of the adjustment signals cause a respective phase modulator output signal to be adjusted in phase with respect to the reference signal by a predetermined offset.

3. The apparatus of claim 1, wherein the plurality of digital processors cause the plurality of phase modulators to output respective phase modulator output signals so that phases or relative phase offsets for the respective phase modulator output signals are maintained to be the same over time.

4. The apparatus of claim 1, wherein the periodic voltage function is a signal having a sawtooth shape.

5. The apparatus of claim 1, wherein the periodic pulse signal is a reset signal that resets a counter value.

6. The apparatus of claim 1, wherein the synchronization controller is implemented using a field programmable gate array (FPGA).

7. The apparatus of claim 1, wherein each digital processor of the plurality of digital processors is implemented using an FPGA.

8. The apparatus of claim 7, wherein the FPGAs that form the plurality of digital processors together cause adjustments in the phase modulator output signals so that at least some of the phase modulator output signals are adjusted in phase with respect to the reference signal by a predetermined offset.

9. The apparatus of claim 8, wherein the FPGAs that form the plurality of digital processors are configured to periodically update the output adjustment signals in order to control the phase of the respective phase modulator output signals so that phases or relative phase offsets for the respective phase modulator output signals are maintained to be the same over time.

10. The apparatus of claim 1, wherein each digital processor is configured to send a plurality of respective adjustment signals to a subset of phase modulators of the plurality of phase modulators.

11. The apparatus of claim 1, wherein each phase modulator is configured to receive the carrier signal and a respective information signal, and to encode the respective information signal into the optical domain using the carrier signal to form a respective phase modulator output signal.

12. A method for controlling phase of a plurality of optical signals, the method comprising:
    receiving a reference signal and a carrier signal, the reference signal and carrier signal being optical signals having the same phase and frequency;
    using the carrier signal to generate a plurality of optical input signals, the plurality of optical input signals including a first group of optical input signals and a second group of optical input signals;
    generating a respective interference signal for each particular optical input signal of the plurality of optical input signals, by using each respective particular optical input signal and the reference signal, thereby generating a plurality of interference signals including a first group of interference signals and a second group of interference signals;
    converting the plurality of interference signals to digital signals to generate a plurality of digital signals including a first group of digital signals and a second group of digital signals;
    inputting the first group of digital signals to a first digital processor, and simultaneously inputting the second group of digital signals to a second digital processor;
    transmitting, by the first digital processor, a first group of adjustment signals respectively corresponding to the first group of optical input signals, and transmitting, by the second digital processor, a second group of adjustment signals respectively corresponding to the second group of optical input signals; and
    adjusting the phase of at least one optical input signal of the first group of optical input signals based on the first group of adjustment signals, and adjusting the phase of at least one optical input signal of the second group of optical input signals based on the second group of adjustment signals.

13. The method of claim 12, wherein adjusting the phase of the at least one optical input signal of the first group of optical input signals, and adjusting the phase of the at least one optical input signal of the second group of optical input signals is repeated over time so that phases of the plurality of optical input signals or relative phase offsets for the plurality of optical input signals are maintained to be constant over time.

14. The method of claim 12, wherein generating the respective interference signal for each particular optical input signal of the plurality of optical input signals includes modulating the reference signal using a periodic voltage function to generate a modulated reference signal, and using the modulated reference signal to generate the plurality of interference signals.

15. The method of claim 14, wherein:
the first digital processor comprises a first field programmable gate array (FPGA), and
the second digital processor comprises a second FPGA separate from the first FPGA, and further comprising:
a synchronization controller configured to send a control signal simultaneously to the first FPGA and the second FPGA, the control signal including a pulse corresponding to a start of each cycle of the modulated reference signal.

16. The method of claim 14, wherein the modulated reference signal has a sawtooth shape.

17. The method of claim 14, wherein each respective interference signal is generated by combining the modulated reference signal with a respective optical input signal.

18. The method of claim 12, wherein:
adjusting the phase of at least one optical input signal of the first group of optical input signals is performed by a first group of phase modulators connected to receive respective adjustment signals from a respective first digital processor and configured to modulate the phase of the at least one optical input signal of the first group of optical input signals based on a respective at least one adjustment signal and the carrier signal; and
adjusting the phase of at least one optical input signal of the second group of optical input signals is performed by a second group of phase modulators connected to receive respective adjustment signals from a respective second digital processor and configured to modulate the phase of the at least one optical input signal of the second group of optical input signals based on a respective at least one adjustment signal and the carrier signal.

19. The method of claim 18, wherein:
adjusting the phase of the at least one optical input signal of the first group of optical input signals, and adjusting the phase of the at least one optical input signal of the second group of optical input signals results in all optical input signals of the first group of optical input signals and all optical input signals of the second group of optical input signals having a pre-set phase relationship with respect to each other.

20. The method of claim 18, wherein:
the first digital processor comprises a first field programmable gate array (FPGA), and
the second digital processor comprises a second FPGA separate from the first FPGA, and further comprising:
a synchronization controller configured to send a control signal to the first FPGA and the second FPGA, the control signal including a pulse corresponding to a start of each cycle of the modulated reference signal.

21. The method of claim 12, wherein each optical input signal is formed from a respective information signal encoded into the optical domain.

* * * * *